| (12) | United States Patent | (10) Patent No.: US 7,471,658 B2 |
|---|---|---|
| | Veerepalli et al. | (45) Date of Patent: Dec. 30, 2008 |

(54) ADAPTIVE CONTROL OF TRANSMISSION PROCEDURES

(75) Inventors: Sivaramakrishna Veerepalli, Poway, CA (US); Nikolai K. N. Leung, Takoma Park, MD (US)

(73) Assignee: QUALCOMM, Incorporated, San Diego, CA (US)

( * ) Notice: Subject to any disclaimer, the term of this patent is extended or adjusted under 35 U.S.C. 154(b) by 1106 days.

(21) Appl. No.: 10/310,251

(22) Filed: Dec. 4, 2002

(65) Prior Publication Data

US 2004/0109426 A1 Jun. 10, 2004

(51) Int. Cl.
*H04B 7/216* (2006.01)

(52) U.S. Cl. .................. 370/335; 370/335; 370/329; 455/232.1; 455/235.1; 455/238.1; 455/328; 455/329

(58) Field of Classification Search ............. 455/229, 455/232, 235, 238, 328, 329, 335, 453, 450, 455/511; 370/335, 329
See application file for complete search history.

(56) References Cited

U.S. PATENT DOCUMENTS 6,519,461 B1 * 2/2003 Andersson et al. ......... 455/453

6,760,303 B1 * 7/2004 Brouwer ..................... 370/229
6,978,143 B1 * 12/2005 Vialen ...................... 455/452.2
7,099,346 B1 * 8/2006 Kanterakis .................. 370/431

FOREIGN PATENT DOCUMENTS

| EP | 0642283 | 3/1995 |
|---|---|---|
| WO | 9637079 | 11/1996 |
| WO | 9909775 | 2/1999 |
| WO | 9952307 | 10/1999 |
| WO | 0051245 | 8/2000 |
| WO | 0131950 | 5/2001 |

* cited by examiner

*Primary Examiner*—Sanh D Phu
(74) *Attorney, Agent, or Firm*—Darrell Scott Juneau; Thomas R. Rouse

(57) ABSTRACT

Systems and techniques are disclosed relating to communications. The systems and techniques involve supporting communications between a base station and a plurality of users by establishing an overhead channel between one of the users and the base station, and transmitting data from said one of the users to the base station on the overhead channel in response to a message having a threshold value related to a loading on the base station by the users. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or the meaning of the claims.

26 Claims, 3 Drawing Sheets

ADAPTIVE CONTROL OF TRANSMISSION PROCEDURES

BACKGROUND

1. Field

The present invention relates generally to communications, and more specifically, to adaptive control of transmission procedures.

2. Background

Wireless communication systems are designed to allow multiple users to share a common communications medium. One such wireless communications system is a code division multiple access (CDMA) system. The CDMA communications system is a modulation and multiple access scheme based on spread-spectrum communications. In a CDMA communications system, a large number of signals share the same frequency spectrum and, as a result, provide an increase in user capacity. This is achieved by transmitting each signal with a different code that modulates a carrier, and thereby, spreads the signal over the entire spectrum. The transmitted signals may be separated in the receiver by a demodulator using a corresponding code to de-spread the desired signal. The undesired signals, whose codes do not match, contribute only to noise.

In recent years, wireless communication devices have been used to access various packet based networks such as the Internet and the like. A common example is a laptop computer connected to a cellular telephone that accesses the Internet through a wireless CDMA network. In these and similar applications, the wireless communications device may establish and maintain a network connection over an air traffic channel with a radio network within the wireless CDMA network. Once the network connection is established, it is usually maintained even if the air traffic channel is torn down during periods of inactivity. By maintaining the network connection, bandwidth may be saved that would otherwise be needed to reestablish a network connection once packet transport resumes. The network connection that exists in the absence of an air traffic channel is referred to as a dormant connection.

When the network connection is dormant, various overhead channels may be used to determine when packets are ready to be transported between the wireless communications device and the packet based network. When data is ready to be transported, a new air traffic channel may be established between the wireless communications device and the radio network. A new air traffic channel, however, tends to consume valuable wireless resources that are needed to support various functions such as power control, handoff and channel allocations. Short data bursts may not require these functions because the data is not continuous, and is usually sent only once in a predetermined time period. Accordingly, it would be advantageous to enable short data burst communications using existing overhead channels without having to establish an air traffic channel between the wireless communications device and the radio network.

SUMMARY

In one aspect of the present invention, a method of communications between a base station and a plurality of users includes establishing an overhead channel between one of the users and the base station, and transmitting data from said one of the users to the base station on the overhead channel in response to a message having a threshold value related to a loading on the base station by the users.

In another aspect of the present invention, an apparatus capable of communicating with a base station includes an overhead channel generator, and a controller configured to couple data to the overhead channel generator in response to a message having a threshold value related to a loading on the base station.

In yet another aspect of the present invention, a radio network includes a message generator configured to generate a message as a function of a loading on the base station by a plurality of users, and a transmitter configured to transmit the message to the users to control whether data from each of the users is transmitted to the base station on an overhead channel.

In a further aspect of the present invention, computer readable media embodying a program of instructions executable by a computer program performs a method of communications between a base station and a plurality of users, the method includes establishing an overhead channel between one of the users and the base station, and coupling data to the overhead channel in response to a message having a threshold value related to a loading on the base station by the users.

In yet a further aspect of the present invention, an apparatus capable of communicating with a base station includes means for generating an overhead channel, and means for coupling data to the overhead channel in response to a message having a threshold value related to a loading on the base station.

In another aspect of the present invention, a radio network includes means for generating a message as a function of a loading on the base station, and means for transmitting the message to a plurality of users to control whether data from each of the users is transmitted to the base station on an overhead channel.

It is understood that other embodiments of the present invention will become readily apparent to those skilled in the art from the following detailed description, wherein it is shown and described only exemplary embodiments of the invention by way of illustration. As will be realized, the invention is capable of other and different embodiments and its several details are capable of modification in various other respects, all without departing from the spirit and scope of the present invention. Accordingly, the drawings and detailed description are to be regarded as illustrative in nature and not as restrictive.

BRIEF DESCRIPTION OF THE DRAWINGS

Aspects of the present invention are illustrated by way of example, and not by way of limitation, in the accompanying drawings, wherein.

DETAILED DESCRIPTION

The detailed description set forth below in connection with the appended drawings is intended as a description of exemplary embodiments of the present invention and is not intended to represent the only embodiments in which the present invention may be practiced. The term "exemplary" used throughout this description means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention.

In an exemplary embodiment of a communications system, a subscriber station may access a network with short data bursts over an existing overhead channel without the need to establish an air traffic channel. The term subscriber station is used herein to mean any device that communicates through a wireless medium with a radio network including, but not limited to, a cellular telephone, a personal digital assistant, a pager, a modem, a computer, hardware, software, or any combination thereof. For the purposes of explanation, the subscriber station will be described in the context of a CDMA communications system. However, as those skilled in the art will appreciate, the inventive concepts described throughout this disclosure are likewise suitable for use in various other communication environments.

Figure 1:
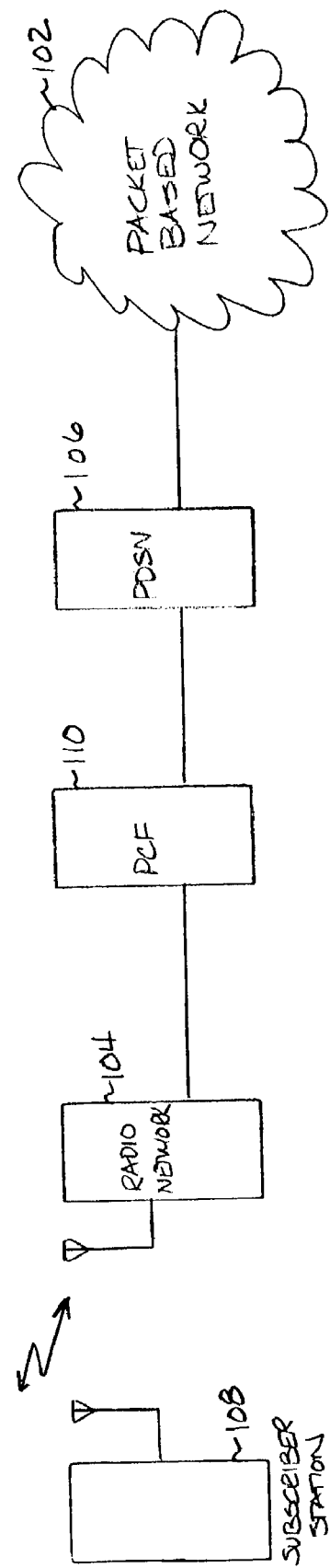
FIG. 1 is a conceptual block diagram of an exemplary communications system capable of providing user access to a packet based network trough a CDMA wireless network.

FIG. 1 is a conceptual block diagram of an exemplary communications system 100 capable of providing user access to a packet based network 102 through a CDMA wireless network. The CDMA wireless network includes any number of radio networks for connecting one or more subscriber stations to the packet based network 102. A radio network may be defined as a collection of base stations and one or more base station controllers. For ease of explanation, only one radio network 104 is shown. The radio network 104 may be connected to a packet data serving node (PDSN) 106. The PDSN 106 may be used to establish, maintain and terminate a network connection with a subscriber station 108. A packet control function (PCF) 110 may be used to connect one or more radio networks to the PDSN 106. Alternatively, a PCF may be integrated into each radio network. Either way, the PCF 110 may be used to provide a variety of functions including monitoring the radio network 104 to determine whether the network connection is dormant and buffering packets from the PDSN 106 when the air traffic channel is down or when the radio network resources are insufficient to support the flow of packets from the PDSN 106.

The subscriber station 108 accesses the packet based network 102 by first establishing an air traffic channel with one or more base stations in the radio network 104 using an access procedure. The access procedure involves the acquisition of a forward link pilot signal by the subscriber station 108. The forward link refers to transmissions from the radio network 104 to the subscriber station 108. Once the subscriber station 108 acquires the pilot signal, it may access a synchronization channel to obtain broadcast system information. The subscriber station 108 may then initiate a call with a set of signaling message to the radio network 104 over an access channel. In response to the signaling messages, an air traffic channel may be established between the subscriber station 108 and the radio network 104 to provide access to the packet based network 102.

Once an air traffic channel is established, logical resource connections may be negotiated with the PCF 110 to establish a connection between the radio network 104 and the PDSN 106. A data link may then be established between the subscriber station 108 and the PDSN 106 by means known in the art. By way of example, a point-to-point protocol (PPP) may be used to configure the data link to support one or more network layer protocols, including but not limited to, Internet Protocol (IP). Once the network layer protocols have been configured, data packets may be transported over the network connection.

In many applications, such as web browsing, the data packets are transmitted over the air traffic channel in bursts. Initially, a large number of data packets may be transmitted over the air traffic channel as a web page is downloaded, followed by a break in the transmission as the subscriber station 108 reads the contents of the downloaded page. During this transmission break, the air traffic channel remains inactive and underutilized. In wireless communication systems that support dormant network connections, the air traffic channel may be torn down during transmission breaks and made available for use by other subscriber stations. Once the web page is downloaded to the subscriber station 108, a user initiated network communication may be made by transmitting data packets over a reverse link. The reverse link refers to transmissions from the subscriber station 108 to the radio network 104. The reverse link communications may be made by establishing a new air traffic channel to transport the data packets, or by transmitting the data packets in one or more short data bursts over the access channel.

When the network connection is dormant, short data bursts over the access channel may provide a very efficient way to transmit a small number of data packets. However, when the number of data packets is large, a dedicated air traffic channel may be a better approach. While establishing an air traffic channel may take longer then transmitting a short data burst on the access channel, it may ultimately be more efficient. The access channel is shared by multiple subscriber stations, and the transmission of a large number of data packets over the access channel could result in access channel delays that impact the performance of many subscriber stations. A threshold at the subscriber station 108 may be used to determine whether a new air traffic channel should be established to support reverse link communications. Short data bursts over the access channel may be used if the number of data packets is below the threshold. Conversely, if the number of data packets exceeds the threshold, then the access channel may be used to send a set of signaling messages to the radio network 104 to establish a new air traffic channel.

The threshold may be fixed or adaptive. An adaptive threshold may provide improved performance by considering not only the number of data packets to be transmitted, but the loading on the serving base station within the radio network 104. The loading on the base station may be determined from any number of loading components. For example, the loading on the access channel may be used to adapt the threshold. In the event that the access channel is congested, the threshold may be adjusted downward to encourage the subscriber station 108 to use an air traffic channel to support reverse link communications and avoid further compounding the congestion. If, on the other hand, the access channel is lightly loaded, the threshold may be adjusted upward to encourage the subscriber station 108 to use the access channel to support reverse link communications.

Another loading component that may be used to adapt the threshold is the number of air traffic channels used by the base station to support communications with other users. Because air traffic channels are a limited resource, the threshold may be adjusted upward to encourage the subscriber station 108 to use the access channel to support reverse link communications when air traffic channels are in high demand. Conversely, when the demand for air traffic channels is low, the threshold may be adjusted downward to encourage the subscriber station 108 to establish a new air traffic channel to support reverse link communications.

In at least one embodiment of a wireless communications system, the adaptive threshold may be computed based on an algorithm that is a function of the loading on the access channel and the number of air traffic channels used by the base station to support communications with other users. In other embodiments, the algorithm may be based on other loading components, either alone or in combination with the loading on the access channel and/or the number of air traffic control channels. The specific algorithm used to compute the threshold may vary depending on the overall design criteria and performance parameters of the communications system, and those skilled in the art will be readily able to determine the algorithm either empirically, mathematically, or by other means from the teachings throughout this disclosure.

Figure 2:
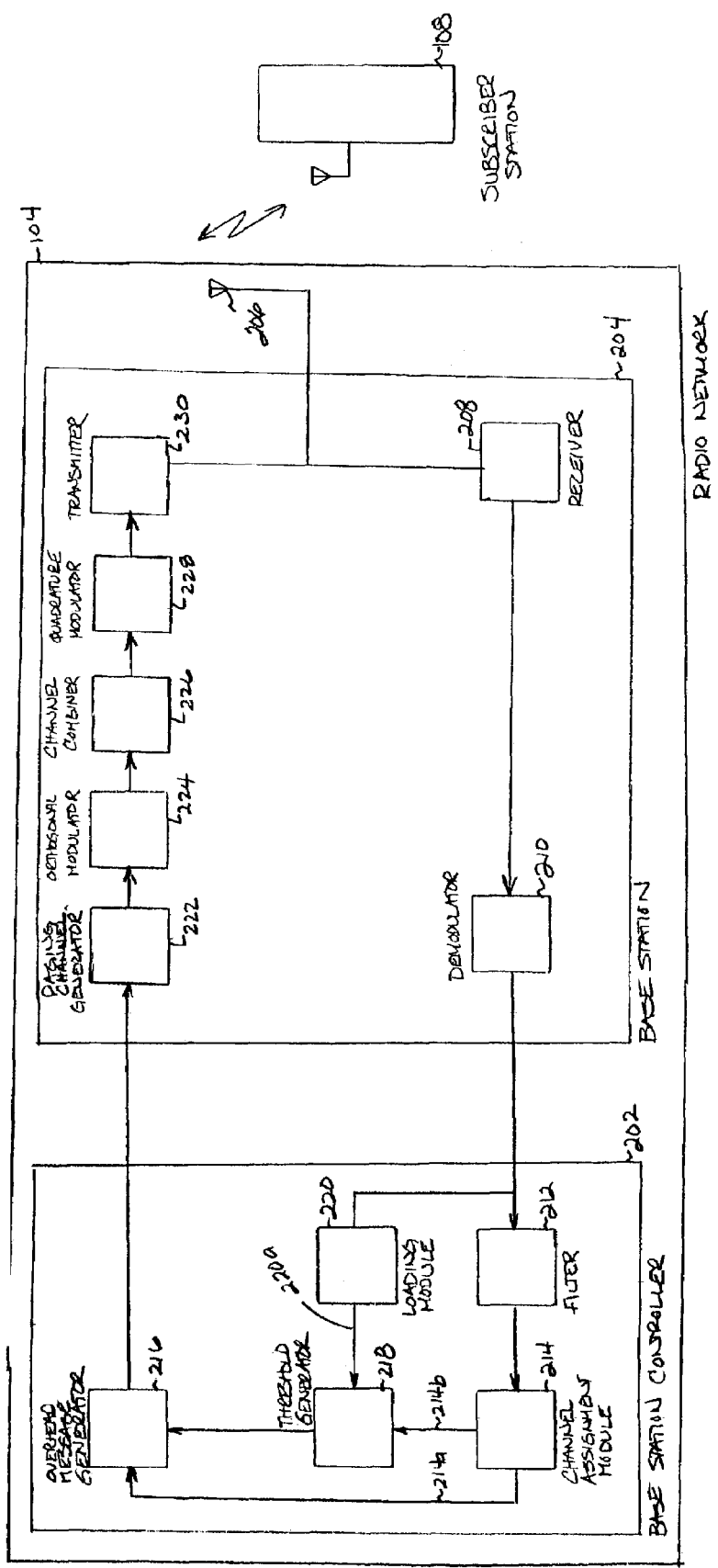
FIG. 2 is a simplified functional block diagram illustrating the basic subsystems of an exemplary radio network for implementing an adaptive threshold to control reverse link communications.

FIG. 2 is a simplified functional block diagram illustrating the basic subsystems of an exemplary radio network for implementing an adaptive threshold to control reverse link communications. The radio network 104 may be configured with a single base station controller (BSC) 202 to provide an interface between a PDSN (not shown) and all base stations dispersed throughout a geographic region. For ease of explanation, only one base station 204 is shown. As those skilled in the art will appreciate, the radio network 104 may be configured to extend its geographic reach through a network of multiple BSCs each supporting one or more base stations. The geographic region is generally subdivided into smaller regions known as cells. Each base station may be configured to serve all subscriber stations within its cellular region.

Each subscriber station may use the access channel to request an air traffic channel from the base station 204. A set of signaling messages generated by the requesting subscriber stations may be spread with a fixed Walsh code assignment common to all subscriber stations for the access channel and transmitted to the base station 204. An outer layer of coding known as pseudo-random noise (PN) codes may be used to identify the requesting subscriber stations and the receiving base station.

At the base station, an antenna 206 may be used to couple the reverse link transmission from all subscriber stations to a receiver 208. The receiver 208 may provide amplification, filtering and down-conversion of the reverse link transmission to a baseband signal. The baseband signal may be provided to a demodulator 210 where it is de-spread to recover the signaling messages from the requesting subscriber stations. This involves the correlation of the baseband signal with the PN codes to separate the reverse link transmission for each subscriber station. The signaling messages for each subscriber station may then be recovered by correlating the reverse link transmission with the Walsh code assignment for the access channel. The signaling messages may then be provided to the BSC 202 for the purposes of assigning air traffic channels to the various subscriber stations.

The BSC 202 may be configured with a filter 212, which separates the signaling messages from the short data bursts on the access channel. The signaling messages may then be provided to a channel assignment module 214, which assigns the air traffic channels for the base station 204 based on the signaling messages. The air traffic channel assignments 214a may be provided to an overhead message generator 216 where they may be formatted as an overhead message. The channel assignment module 214 may also be used to generate a first signal 214b representing the current number of air traffic channel assignments for the base station 204. The first signal 214b together with a second signal 220a representing loading on the access channel may be provided to a threshold generator 218. The second signal 220a may be generated by a loading module 220 which monitors the access channel from the base station 204.

The threshold generator 218 may be implemented with an algorithm that computes a threshold value as a function of the signals 214b and 220a. The specific algorithm used to compute the threshold value may depend on a variety of factors such as the specific application, the overall design criteria, the performance parameters, and/or any other relevant factors. An exemplary algorithm may be implemented as a mathematical expression which states that for a constant loading on the access channel, the threshold value is directly proportional to the number of air traffic channels assigned. The mathematical expression may also state that for a constant number of air traffic channels, the threshold value varies inversely with the loading on the access channel. This mathematical expression may be derived by those skilled in the art. Moreover, the exemplary algorithm may be adapted by the skilled artisan to optimize transmission performance when both the load on the access channel and the number of air traffic channels vary simultaneously.

The threshold value may be provided to the overhead message generator 216 may be formatted as an overhead message. The overhead message may then be provided to the base station 204 for transmission over a paging channel. A paging channel generator 222 may provide encoding, interleaving and scrambling with a unique long PN code for each subscriber station. An orthogonal modulator 224 may then be used to spread the paging channel with the assigned Walsh code. Alternatively, the overhead message from the BSC 202 may be transmitted on its own overhead channel with an unique Walsh code assignment. Either way, the output from the orthogonal modulator 224 may be combined with all other base station forward link channels with a channel combiner 226 a spread with short PN codes with a quadrature modulator 228. The short PN codes are used to identify the base station. A transmitter 230 may be used to filter, amplify and upconvert the output of the quadrature modulator 228 to a carrier frequency before transmission over the forward link from the base station 204 to the subscriber station 108 via an antenna 206.

Figure 3:
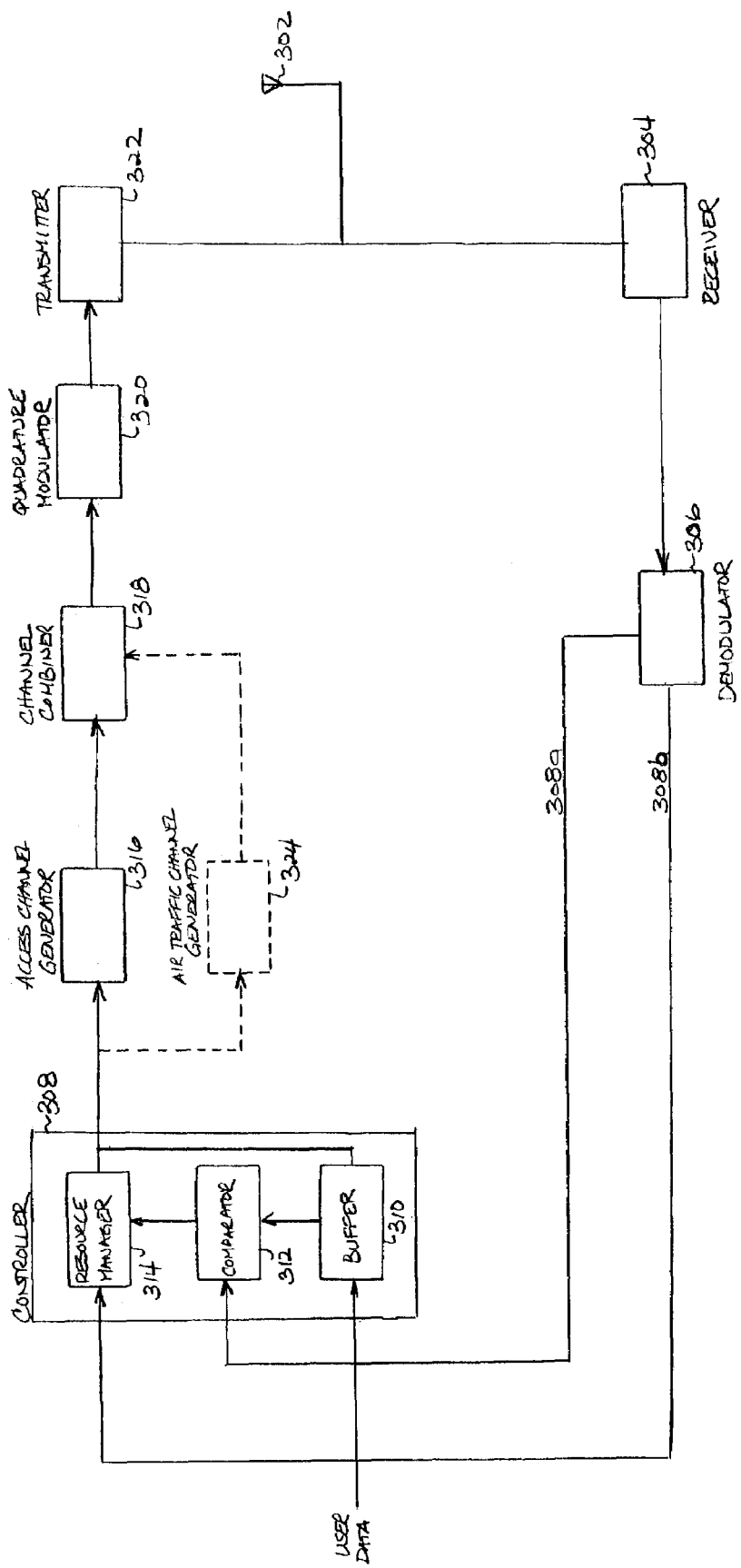
FIG. 3 is a functional block diagram of an exemplary subscriber station.

FIG. 3 is a functional block diagram of an exemplary subscriber station. An antenna 302 may be used to couple the forward link transmission from the base station to a receiver 304. The receiver 302 may provide amplification, filtering and down-conversion of the forward link transmission to a baseband signal. The baseband signal from the receiver 304 may be coupled to a demodulator 306 to recover the paging channel for the subscriber station. The demodulator 306 may be configured to provide quadrature demodulation with the short PN codes and despreading with assigned Walsh code for the paging channel. The threshold value 308a, which is common to all subscriber stations, may be coupled to a controller 308.

With a dormant network connection between the subscriber station 108 and the PDSN (not shown), the user may initiate a network communication by loading a buffer 310 with data. A comparator 312 may be used to compare the amount of data in the buffer 310 with the threshold value from the demodulator 306. If the comparator 312 determines that the amount of data in the buffer 310 is less than threshold, then the data in the buffer 310 may be released by a resource manager 314 in short data bursts over the access channel. Conversely, if the comparator 312 determines that the amount of data in the buffer 310 exceeds the threshold from the demodulator 306, the resource manager 314 may be used to generate a set of signaling messages for transmission over the access channel to request an air traffic channel from the base station. In any event, an access channel generator 316 may be used to encode the controller output before spreading it with a fixed Walsh code assignment common to all subscriber stations for the access channel. The output of the access channel generator 316 may be combined with the other overhead and traffic channels by a channel combiner 318 and provided to a quadrature modulator 320 for spreading with the short PN codes. A transmitter 322 may be used to amplify, filter and upconvert the output of the orthogonal modulator 320 to a carrier frequency before transmission over the reverse link via the antenna 302.

In the case where the subscriber station requests an air traffic channel, the base station may send an air traffic assignment back to the subscriber station over the paging channel. As described in detail earlier, the paging channel may be routed through the antenna 302 to the receiver 304 and recovered by the demodulator 306. However, unlike the threshold value 308a, which is common to all subscriber stations, the air traffic channel assignments are unique to each subscriber station, and therefore, should be descrambled with the appropriate long PN code. The descrambled paging channel 308b may then be provided to the resource manager 314. If the resource manager 314 determines that an air traffic assignment has been made, it will invoke an air traffic channel generator 324 and assign a Walsh channel to the air traffic channel.

Once an air traffic channel has been assigned, the resource manager 314 may couple the data from the buffer 310 to the air traffic channel generator 324. The air traffic channel generator 324 may encode and interleave the data from the buffer 310 before spreading it with the assigned Walsh code for the air traffic channel. The output of the air traffic channel generator 324 may then be combined with other traffic and overhead channels, quadrature modulated with the short PN codes, amplified, filtered and upconverted to a carrier frequency for transmission over the reverse link.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of communications in a wireless communications system, comprising:
    establishing a wireless packet-based network connection between a wireless user station and a base station using an air traffic channel;
    establishing an overhead channel;
    releasing the air traffic channel for use by another wireless user station during a period of data packet inactivity while maintaining the network connection between the wireless user station and the base station as a dormant network connection using the overhead channel;
    receiving a message indicating loading of the system;
    comparing the loading to a threshold; and
    transmitting data packets for a short data burst message on the overhead channel if the loading is below the threshold.

2. The method of claim 1 wherein establishing the overhead channel comprises assigning a code to the overhead channel.

3. The method of claim 2 wherein the code comprises a Walsh code.

4. The method of claim 2 wherein transmitting the short data burst message on the overhead channel comprises spreading the data with the code.

5. The method of claim 1 further comprising:
    reactivating the air traffic channel for the wireless packet-based network connection and transmitting the data packets for the short data burst message on the air traffic channel if the loading is above the threshold.

6. The method of claim 1 wherein the overhead channel comprises an access channel adapted to request an air traffic channel.

7. The method of claim 1 wherein the loading on the base station includes the number of air traffic channels established by the base station to communicate with the wireless user stations.

8. The method of claim 1 wherein the overhead channel is common to each of the wireless user stations.

9. The method of claim 1 wherein the network connection is based on a point-to-point protocol.

10. The method of claim 1 wherein the network connection is based on an Internet protocol.

11. An apparatus for communications in a wireless communications system, comprising:
    means for establishing a wireless packet-based network connection between a wireless user station and a base station using an air traffic channel;
    means for establishing an overhead channel;
    means for releasing the air traffic channel for use by another wireless user station during a period of data packet inactivity while maintaining the network connection between the wireless user station and the base station as a dormant network connection using the overhead channel;

means for receiving a message indicating loading of the system;

means for comparing the loading to a threshold; and means for transmitting data packets for a short data burst message on the overhead channel if the loading is below the threshold.

12. The apparatus of claim 11, wherein establishing the overhead channel comprises assigning a code to the overhead channel.

13. The apparatus of claim 12, wherein the code comprises a Walsh code.

14. The apparatus of claim 12, wherein transmitting the short data burst message on the overhead channel comprises spreading the data with the code.

15. The apparatus of claim 11, further comprising:

means for reactivating the air traffic channel for the wireless packet-based network connection and transmitting the data packets for the short data burst message on the air traffic channel if the loading is above the threshold.

16. The apparatus of claim 11, wherein the overhead channel comprises an access channel adapted to request an air traffic channel.

17. The apparatus of claim 11, wherein the loading on the base station includes the number of air traffic channels established by the base station to communicate with the wireless user stations.

18. The apparatus of claim 11, wherein the overhead channel is common to each of the wireless user stations.

19. The apparatus of claim 11 wherein the network connection is based on a point-to-point protocol.

20. The apparatus of claim 11 wherein the network connection is based on an Internet protocol.

21. An apparatus for communications in a wireless communications system, comprising:

a processor configured for, establishing a wireless packet-based network connection between a wireless user station and a base station using an air traffic channel;

establishing an overhead channel;

releasing the air traffic channel for use by another wireless user station during a period of data packet inactivity while maintaining the network connection between the wireless user station and the base station as a dormant network connection using the overhead channel;

receiving a message indicating loading of the system;

comparing the loading to a threshold; and transmitting data packets for a short data burst message on the overhead channel if the loading is below the threshold;

a memory coupled to the processor for storing data.

22. The apparatus of claim 21, wherein the processor is further configured for establishing the overhead channel comprises assigning a code to the overhead channel.

23. The apparatus of claim 21, wherein the processor is further configured for reactivating the air traffic channel for the wireless packet-based network connection and transmitting the data packets for the short data burst message on the air traffic channel if the loading is above the threshold.

24. A computer-readable medium comprising code, which, when executed by a machine, cause the machine to perform operations for controlling transmission procedures, the code comprising:

a first set of codes for establishing a wireless packet-based network connection between a wireless user station and a base station using an air traffic channel;

a second set of codes for establishing an overhead channel;

a third set of codes for releasing the air traffic channel for use by another wireless user station during a period of data packet inactivity while maintaining the network connection between the wireless user station and the base station as a dormant network connection using the overhead channel;

a fourth set of codes for receiving a message indicating loading of the system;

a fifth set of codes for comparing the loading to a threshold; and a sixth set of codes for transmitting data packets for a short data burst message on the overhead channel if the loading is below the threshold.

25. The computer-readable medium of claim 24, further comprising:

code for establishing the overhead channel comprises assigning a code to the overhead channel.

26. The computer-readable medium of claim 24, further comprising:

code for reactivating the air traffic channel for the wireless packet-based network connection and transmitting the data packets for the short data burst message on the air traffic channel if the loading is above the threshold.

* * * * *